US012794768B2

(12) United States Patent
Yu et al.

(10) Patent No.: US 12,794,768 B2
(45) Date of Patent: Nov. 10, 2026

(54) ARTIFICIAL INTELLIGENCE-BASED UNBOXING SETUP GUIDANCE SYSTEM, METHOD FOR ELECTRONIC PRODUCTS AND SMART MOBILE TERMINAL

(71) Applicant: SOLOS TECHNOLOGY (SHENZHEN) LIMITED, Shenzhen (CN)

(72) Inventors: Chi Sum Yu, Shenzhen (CN); King Hong Chung, Shenzhen (CN); Chun Tung Chow, Shenzhen (CN); Kenneth Fan, Somerville, MA (US); Wai Kuen Cheung, Shenzhen (CN)

(73) Assignee: Solos Technology Limited, Shatin (HK)

( * ) Notice: Subject to any disclaimer, the term of this patent is extended or adjusted under 35 U.S.C. 154(b) by 89 days.

(21) Appl. No.: 19/037,206

(22) Filed: Jan. 26, 2025

(65) Prior Publication Data

US 2025/0175382 A1 May 29, 2025

Related U.S. Application Data

(63) Continuation of application No. PCT/CN2024/105372, filed on Jul. 13, 2024.

(30) Foreign Application Priority Data

Aug. 10, 2023 (CN) ......................... 202311010482.4

(51) Int. Cl.
*H04L 41/0806* (2022.01)
*G06F 3/0483* (2013.01)
(Continued)

(52) U.S. Cl.
CPC ........ *H04L 41/0806* (2013.01); *G06F 3/0483* (2013.01); *G06F 3/167* (2013.01); *G06F 40/40* (2020.01); *H04L 41/16* (2013.01)

(58) Field of Classification Search
CPC ..... H04L 41/0806; H04L 41/16; G06F 40/40; G06F 3/0483; G06F 3/167
(Continued)

(56) References Cited

U.S. PATENT DOCUMENTS 12,346,367 B2 * 7/2025 O'Neill ................. G06F 16/435
2020/0118548 A1 * 4/2020 Huang .................... G10L 15/30
(Continued)

FOREIGN PATENT DOCUMENTS

CN 104142787 A 11/2014
EP 3674922 B1 * 3/2022 ........... G06F 16/435

OTHER PUBLICATIONS

International Search Report of PCT Patent Application No. PCT/CN2024/105372 issued on Sep. 24, 2024.
(Continued)

*Primary Examiner* — Anthony Mejia
(74) *Attorney, Agent, or Firm* — Caldwell LLC

(57) ABSTRACT

An artificial intelligence-based electronic product unboxing setup guidance system, method, and smart mobile terminal, wherein the guidance system includes a smart mobile terminal and a model server. The model server is equipped with a generative artificial intelligence large language model, while the smart mobile terminal hosts a client program with multiple demonstration pages. The smart mobile terminal plays these demonstration pages to guide the user in unboxing and setting up the electronic product. During this process, it collects interaction information between the user and the client program and transmits text generated from this interaction to the model server. The model server analyzes the text using the generative artificial intelligence large language model and returns the analysis results to the smart mobile terminal. Based on these results, the smart mobile terminal identifies and displays the appropriate demonstra-
(Continued)

tion page, thereby enhancing the efficiency of unboxing setup and increasing product loyalty.

21 Claims, 11 Drawing Sheets

(51) Int. Cl.
*G06F 3/16* (2006.01)
*G06F 40/40* (2020.01)
*H04L 41/16* (2022.01)

(58) Field of Classification Search
USPC .......................................................... 709/220
See application file for complete search history.

(56) References Cited

U.S. PATENT DOCUMENTS

| | | | | |
|---|---|---|---|---|
| 2020/0118559 | A1* | 4/2020 | Huang | G10L 15/1815 |
| 2021/0184936 | A1* | 6/2021 | Mutnuru | H04L 41/0806 |
| 2022/0222640 | A1* | 7/2022 | Mimassi | G06Q 20/202 |
| 2023/0176805 | A1* | 6/2023 | Dudovitch | A63F 13/69<br>715/757 |

OTHER PUBLICATIONS

Written Opinion of the International Searching Authority of PCT Patent Application No. PCT/CN2024/105372 issued on Sep. 24, 2024.

* cited by examiner

FIG. 11
10
Chat Settings
Off
Switch on SolosChat
To start Conversation
Chat History
AIRGO
soloschat
MY GLASSES

ARTIFICIAL INTELLIGENCE-BASED UNBOXING SETUP GUIDANCE SYSTEM, METHOD FOR ELECTRONIC PRODUCTS AND SMART MOBILE TERMINAL

CROSS REFERENCE TO RELATED APPLICATIONS

This application is a Continuation Application of PCT Application No. PCT/CN2024/105372 filed on Jul. 13, 2024, which claims priority to Chinese Patent Application No. 202311010482.4, titled "ARTIFICIAL INTELLIGENCE-BASED UNBOXING SETUP GUIDANCE SYSTEM, METHOD FOR ELECTRONIC PRODUCTS, AND TERMINAL", filed on Aug. 10, 2023, which is hereby incorporated by reference herein as if set forth in its entirety.

BACKGROUND

1. Technical Field

The present disclosure generally relates to the technical field of smart glasses, and in particularly to an artificial intelligence-based unboxing setup guidance system, method for electronic products, and smart mobile terminal.

2. Description of Related Art

The unboxing refers to the process in which a user opens the packaging box after purchasing a product, takes out an electronic product packaged in the packaging box, assembles the electronic product, and sets up functions or parameters for the electronic product. As the computer technology has advanced, the smart electronic products are becoming more and more popular and having increasingly complex structures and functions. Existing paper manuals typically consist of minimal instructions, often insufficient to provide effective guidance during the unboxing and setup process. Especially when the manuals are unclear, the setup procedures are intricate, or the user encounters technical malfunctions, the users are often unable to properly set up and use the electronic product, thereby affecting the efficiency of unboxing and setup process. Consequently, users may experience dissatisfaction, leading to diminished loyalty towards the products.

SUMMARY

The embodiments of the present disclosure provide an artificial intelligence (AI)-based unboxing setup guidance system and method for electronic products and smart mobile terminal, which aim to improve the efficiency of unboxing configuration and using of electronic products, and increase the user's loyalty towards the products.

An embodiment of the present disclosure provides an AI-based unboxing setup guidance system for electronic products. The system includes a smart mobile terminal and a model server. A generative artificial intelligence large language model (GAILLM) is configured on the model server, and a client program with a plurality of demo pages is installed on the smart mobile terminal.

The smart mobile terminal is used for: displaying, through the client program, the demo pages to guide a user to perform unboxing configuration on an electronic product, obtaining interactive data between the user and the client program during the unboxing configuration, and transmitting a text generated based on the interactive data to the model server.

The model server is used for: analyzing the text through the GAILLM to obtain an analysis result, and transmitting the analysis result to the smart mobile terminal.

The smart mobile terminal is further used for: determining a target demo page according to the analysis result, and displaying the target demo page.

An embodiment of the present disclosure provides an AI-based unboxing setup guidance method for electronic products, implemented on a smart mobile terminal. The method includes:

- displaying preset demo pages through a client program installed on the smart mobile terminal, to guide a user to perform unboxing configuration on an electronic product, wherein the client program has a plurality of the demo pages;
- obtaining interactive data between the user and the client program during the unboxing configuration, and transmitting a text generated based on the interactive data to a model server, so that the model server analyzes the text through a generative artificial intelligence large language model (GAILLM) to obtain an analysis result, and transmits the analysis result to the smart mobile terminal; and
- determining a target demo page according to the analysis result, and displaying the target demo page.

An embodiment of the present disclosure provides a smart mobile terminal, including: a processor, a non-transitory storage, a wireless communication device, an input device and an output device.

The processor is electrically connected with the non-transitory storage, the wireless communication device, the input device and the output device.

One or more computer programs executable on the processor are stored on the non-transitory storage, and the one or more computer programs include:

- instructions for: displaying, through the output device, demo pages in the client program, to guide a user to perform unboxing configuration on the smart mobile terminal, wherein the client program has a plurality of the demo pages;
- instructions for: obtaining, through the input device, interactive data between the user and the client program during the unboxing configuration, and transmitting, through the wireless communication device, a text generated based on the interactive data to a model server, so that the model server analyzes the text through a generative artificial intelligence large language model (GAILLM) and obtains an analysis result; and
- instructions for: receiving, through the wireless communication device, the analysis result transmitted from the model server, determining a target demo page according to the analysis result, and displaying, through the output device, the target demo page.

In each of the embodiments of the present disclosure, by using the smart mobile terminal to display the demo pages through the client program to guide the user to perform unboxing configuration on the electronic product, obtain user's intention by analyzing the interactive data through GAILLM in the interaction process with the user, and display the target demo page according to the user's intention to solve the problem of the user, the user can be effectively helped to complete the unboxing configuration, thereby improving the efficiency of unboxing configuration and using of the electronic products, and increasing the user's loyalty towards the products.

BRIEF DESCRIPTION OF THE DRAWINGS

In order to more clearly illustrate the technical solutions in this embodiment, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

In order to make the objects, features and advantages of the present disclosure more obvious and easier to understand, the technical solutions in this embodiment will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

In the following descriptions, the terms "including", "comprising", "having" and their cognates that are used in the embodiments of the present disclosure are only intended to represent specific features, numbers, steps, operations, elements, components, or combinations of the foregoing items, and should not be understood as excluding the possibilities of the existence of one or more other features, numbers, steps, operations, elements, components or combinations of the foregoing items or adding one or more features, numbers, steps, operations, elements, components or combinations of the foregoing items.

In addition, in the present disclosure, the terms "first", "second", "third", and the like are only used for distinguishing, and cannot be understood as indicating or implying relative importance.

Unless otherwise defined, all terms (including technical and scientific terms) used herein have the same meanings as commonly understood by those skilled in the art to which the embodiments of the present disclosure belong. The terms (e.g., the terms those defined in commonly used dictionaries) will be interpreted as having the same meaning as the contextual meaning in the relevant technology and will not be interpreted as having idealized or overly formal meanings, unless clearly defined in the embodiments of the present disclosure.

Figure 1:
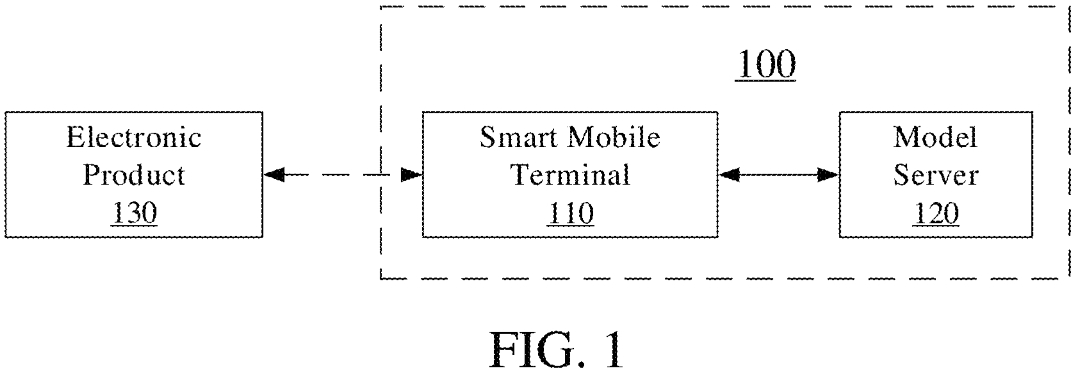
FIG. 1 is a schematic structural diagram of an AI-based unboxing setup guidance system for electronic products according to one embodiment of the present disclosure.

Referring to FIG. 1, a schematic structural diagram of an artificial intelligence (AI)-based unboxing setup guidance system for electronic products according to one embodiment of the present disclosure. As shown in FIG. 1, the AI-based unboxing setup guidance system 100 includes: a smart mobile terminal 110 and a model server 120.

The smart mobile terminal 110 may, but is not limited to, includes: cellular phone, smart phone, other wireless communication devices, personal digital assistant, audio player, other media players, music recorder, video recorder, camera, other media recorders, smart radio, Laptop computer, personal digital assistant (PDA), portable multimedia player (PMP), Moving Picture Experts Group (MPEG-1 or MPEG-2) audio layer 3 (MP3) player, digital camera, and smart wearable device (such as smart watch, smart bracelet, etc.). The smart mobile terminal 110 is further installed with Android, iOS or other operating systems.

The model server 120 may be a single server or a distributed server cluster composed of multiple servers, and at least one Generative Artificial Intelligence Large Language Model (GAILLM) is configured on the model server 120 (for ease of understanding, the following are collectively referred to as the GAILLM server). The GAILLM is a pre-trained language model with billions of parameters (B+) obtained based on AI technologies that can generate content, solutions, or new concepts (e.g. GPT-3, Bloom, LLaMA). The GAILLM is usually obtained based on advanced algorithms, such as deep learning or neural networks, by training with huge amounts of data.

The GAILLM may be, for example but not limited to, Open AI's ChatGPT, Google's Bard, or other models with similar functions. The GAILLM is trained using a large number of characters or character groups and meanings corresponding to the characters or character groups as samples. The characters or character groups may include: characters or character groups converted from user speeches, and the meanings corresponding to the characters or character groups may include incomplete semantics and complete semantics corresponding to the characters or character groups. Alternatively, the characters or character groups may further include: characters or character groups inputted by the users, and the meanings corresponding to the characters or character groups may include complete semantics corresponding to the characters or character groups. Alternatively, the characters or character groups may further include: characters or character groups used to describe the actions of the users, and the meanings corresponding to the characters or character groups may include the intention corresponding to the actions of the users.

Specifically, a client program having a plurality of preset demo pages is installed on the smart mobile terminal 110. The preset demo pages contain preset guidance information, and the guidance information includes: information for introducing the electronic product 130, and/or, at least one of texts, demo animations and voices for guiding the user to perform one or more actions related to unboxing. The one or more actions related to unboxing may, but are not limited to, include: assembling the electronic product 130, configuring the parameters of the electronic product 130, using the electronic product 130 and troubleshooting and repairing the electronic product, introducing the functions of the electronic product 130 for the user, guiding the user on how to use the electronic product 130, etc. The smart terminal 110 generally refers to a smart phone, a smart watch, or a smart bracelet, in some specific cases, the smart mobile terminal 110 may be the electronic product 130.

The smart mobile terminal 110 is used for: displaying, through the client program, the demo pages to guide the user to perform unboxing configuration on the electronic product, obtaining interactive data between the user and the client program during the unboxing configuration, and transmitting a text generated based on the interactive data to the model server 120. The electronic product 130 may include, but is not limited to: a smart wearable device (such as, smart glasses, smart watch, smart earring, smart bracelet, smart clothing, smart shoes, hat, etc.) and other smart non-wearable devices (such as, smart camera, smart home appliance, smart phone, tablet, laptop, desktop computer, etc.). The text is generated by the smart mobile terminal 110 based on the interactive data. Alternatively, the smart mobile terminal 110 may transmits the interactive data to other external devices, such as a cloud server or the electronic product 130, and the text is generated based on the interactive data through the other external devices.

The GAILLM server 120 is used for: analyzing the text through the GAILLM, and obtaining and transmitting the analysis result to the smart mobile terminal 110. Specifically, the GAILLM may perform semantic analysis on the text and provide the semantics contained within the analyzed text as the analysis results.

The smart mobile terminal 110 is further used for determining a target demo page according to the analysis result, and displaying the target demo page. For example, the text information and/or image information in the target demo page are displayed on a display screen, the voice in the target demo page is played through speaker(s), and the like. Optionally, the smart mobile terminal 110 further stores a file recording association relationship between a plurality of preset demo pages in the client program (APP) and different analysis results (e.g., different semantics), and the target demo page can be determined by querying the file recording the association relationship between the plurality of preset demo pages and the different analysis results. Specifically, the file recording the association relationship between the plurality of preset demo pages and different analysis results may be a part of the APP, and the APP determines the target demo page by querying the file. Alternatively, the file recording the association relationship between the plurality of preset demo pages and the different analysis results may further be third-party data independent of the APP and stored in the smart mobile terminal 110, another software module in the smart mobile terminal 110 determines the target demo page by querying the file, and transmits relevant data of the target demo page to the APP, so that the APP displays the target demo page.

Optionally, in other embodiments of the present disclosure, the smart mobile terminal 110 is further used for: obtaining a download link of the client program, downloading an installation program of the client program according to the download link, and running the installation program to install the client program on the smart mobile terminal 110. The client program matches device information of the smart mobile terminal. For example, multiple versions of client programs may be stored in the server, which are applicable to smart phones with different operating systems.

Specifically, the smart mobile terminal 110 may obtain the download link of the client program by scanning a graphic code (e.g., QR code or bar code) on the electronic product. Alternatively, the smart mobile terminal 110 may obtain the download link of the client program inputted by the user through an input device (e.g., keyboard, touch display screen, etc.). Alternatively, the smart mobile terminal 110 may obtain the download link of the client program according to search actions performed by the user on the application mall software.

While transmitting a download request to a software storage server according to the download link, the smart mobile terminal 110 transmits the device information of the smart mobile terminal 110 to the software storage server, so that the software storage server transmits the installation program of the client program matching the device information to the smart mobile terminal 110 according to the device information.

The device information of the smart mobile terminal 110 may include, but is not limited to, at least one of: hardware information, type of operating system, version number of operating system, and device model of the smart mobile terminal 110.

Optionally, in other embodiments of the present disclosure, at least one of the demo pages is a user interface (UI), and the interactive data comprises: texts inputted by the user on the UI.

Optionally, in other embodiments of the present disclosure, the interactive data includes: a user speech. The smart mobile terminal 110 is further used for: receiving the user speech transmitted from the electronic product 130, or obtaining the user speech through microphone(s) built-into the smart mobile terminal 110; and converting the user speech into the text.

Specifically, the smart mobile terminal 110 may convert the user speech into the text through a built-in speech-to-text engine. Alternatively, the smart mobile terminal 110 may transmit the user speech to a conversion server, so as to convert the user speech into the text through a speech-to-text engine configured on the conversion server.

The smart mobile terminal 110 determines whether a speech-to-text engine is installed on the smart mobile terminal 110 based on installation logs, calls the speech-to-text engine to convert the user speech into a corresponding text when the speech-to-text engine is installed on the smart mobile terminal 110, and transmits the user speech to the conversion server when the speech-to-text engine is not installed on the smart mobile terminal 110.

Optionally, in other embodiments of the present disclosure, the interactive data includes: personal information inputted by the user.

The smart mobile terminal 110 is further used for: generating a virtual character/avatar matching the personal information of the user, and integrating the virtual character/avatar to the demo pages.

The smart mobile terminal 110 is further used for: synchronously controlling the virtual character/avatar while displaying the target demo page to facilitate interaction with the user.

The virtual character/avatar includes: a two-dimensional or three-dimensional dynamic virtual character image in animation form. In addition to the virtual character, the target demo page further includes preset guidance information, such as, at least one of: explanation texts, demo animation(s) and explanation voice(s) about the function and usage of electronic product asked by the user.

While displaying the guidance information in the target demo page, the smart mobile terminal 110 may control the virtual character/avatar to make corresponding expressions and/or actions synchronously, so as to assist or guide the user to complete the product assembly and/or configuration of the product, or showcase the product's functionalities to the user and assist them in utilizing the product effectively.

Optionally, in other embodiments of the present disclosure, the demo pages include a first demo page designed to guide paring process. The smart mobile terminal 110 is further used for: in response to actions of the user on the first demo page, initiating pairing with the electronic product 130 through the client program and utilizing a short-range wireless communication network. The short-range wireless communication network may include, but is not limited to: a Bluetooth network, a WIFI (Wireless Fidelity) network, an infrared point-to-point communication network (IrDA), a near field communication (NFC) network, a ZigBee network, and the like.

Optionally, in other embodiments of the present disclosure, the demo pages further include a second demo page for guiding registration of new users. The smart mobile terminal 110 is further used for: obtaining registration information inputted by the user on the second demo page, and performing actions for user registration according to the registration information.

Optionally, in other embodiments of the present disclosure, the AI-based unboxing setup guidance system 100 further includes an application server. GAILLM(s) for obtaining target action instructions are configured on the application server, and the GAILLM(s) for obtaining target action instructions are trained with a large number of analysis results and corresponding action instructions as samples.

The smart mobile terminal 110 is further used for transmitting the analysis result to the application server.

The application server is used for: obtaining a target action instruction according to the analysis result through the GAILLM(s) for obtaining target action instructions, and transmitting the target action instruction to the smart mobile terminal 110.

The smart mobile terminal 110 is further used for performing one or more actions indicated by the target action instruction through the client program. The one or more actions include at least one of the following: displaying a page indicated by the target action instruction, displaying animation(s) indicated by the target action instruction, playing voice(s) indicated by the target action instruction, displaying the texts indicated by the target action instruction, modifying configuration parameter(s) of the virtual character/avatar, and running application(s) indicated by the target action instruction. Modifying the configuration parameter(s) of the virtual character/avatar may specifically include, but is not limited to: modifying an image, expression, action or voice of the virtual character/avatar to an image, expression, action or voice specified by the user. Specifically, the user can personalize the configuration parameters of the virtual character/avatar by selecting his or her favorite image, expression, action or voice from a plurality of alternative images, expressions, actions or voices of the virtual character/avatar preset in the client program (APP) by clicking actions on a menu bar provided by the APP or through the voice commands.

Optionally, in other embodiments of the present disclosure, after obtaining the analysis result, the model server 120 may transmit the analysis result and the identity information of the smart mobile device 110 to the application server, so that the application server obtains, through the GAILLM for obtaining target action instructions, the target action instruction according to the analysis result, and transmits the target action instruction to the smart mobile device 110 according to the identity information of the smart mobile device 110.

Optionally, in other embodiments of the present disclosure, the AI-based unboxing setup guidance system 100 further includes a page server storing a plurality of demo pages.

The smart mobile terminal 110 is further used for: determining whether the plurality of demo pages include the target demo page according to the analysis result, displaying the target demo page when the plurality of demo pages include the target demo page, and when the plurality of demo pages does not include the target demo page, transmitting the description information of the target demo page to the page server to download the target demo page from the page server. The description information of the target demo page may include, but is not limited to, the number or purpose of the target demo page.

Optionally, in other embodiments of the present disclosure, the analysis result includes one or more questions asked by the user.

The smart mobile terminal 110 is further used for: determining whether the one or more questions asked by the user is included in the currently displaying demo page, where the currently displaying demo page includes multiple alternative questions and hyperlinks of demo pages associated with the alternative questions; when the one or more questions asked by the user is included in the currently displaying demo page, displaying one or more target demo pages corresponding to the one or more questions according to the hyperlinks; and when the one or more questions asked by the user is not included in the currently displaying demo page, transmitting the one or more questions asked by the user to the application server to determinate the one or more target demo pages through the application server. The application server determines the one or more target demo pages according to the one or more questions asked by the user, and transmits identity information of the one or more target demo pages, one or more download links of the one or more target demo pages, or data of the one or more target demo pages to the smart mobile terminal 110.

The smart mobile terminal 110 is further used for: displaying the one or more target demo pages according to the identity information, or the one or more download links, or the data of the one or more target demo pages transmitted by the application server. The target demo page includes: at least one of texts, demo animation(s) and voice(s) for answering the user's question(s), a virtual character and navigation menu(s).

The AI-based unboxing setup guidance system provided in the embodiment uses the smart mobile terminal to display the demo pages through the client program to guide the user to perform unboxing configuration on the electronic product, analyze the interactive data through the GAILLM to obtain user's intention during the interaction process with the user, and display the target demo page according to the user's intention to solve the problems of the user. Thus, users can be effectively guided to complete the unboxing process, the efficiency of setup and usage of the electronic product can be enhanced, and thereby increasing user engagement and loyalty to the product.

Figure 2:
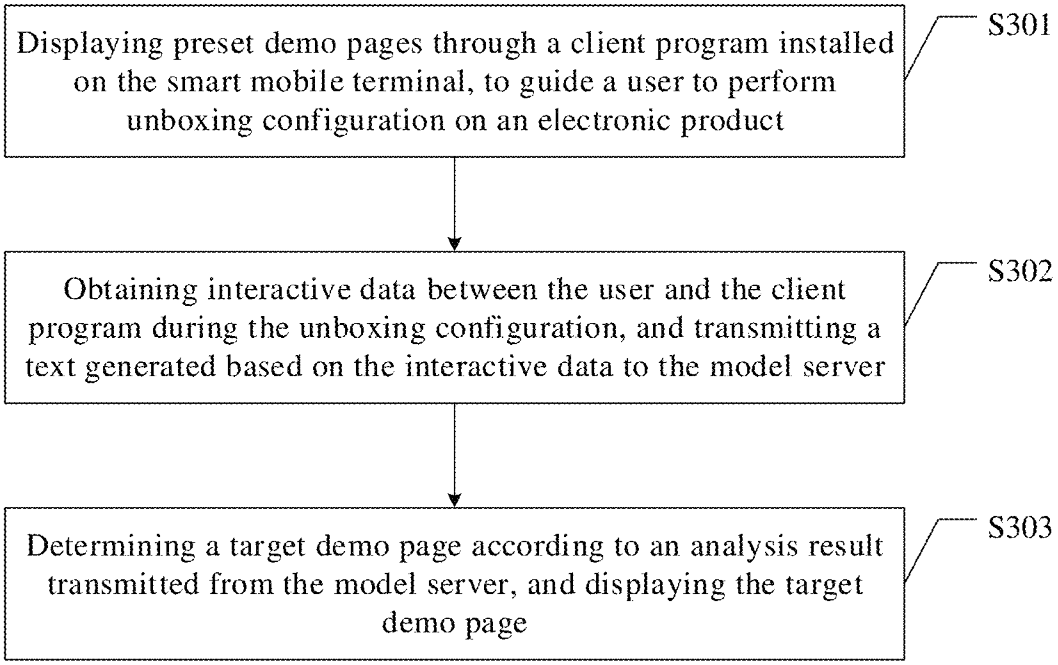
FIG. 2 is a flow diagram of an AI-based unboxing setup guidance method for electronic products according to one embodiment of the present disclosure.

Referring to FIG. 2, a flow diagram of an AI-based unboxing setup guidance method for electronic products according to one embodiment of the present disclosure. The AI-based unboxing setup guidance method can be applied to the smart mobile terminal 110 in the embodiment shown in FIG. 1. As shown in FIG. 2, the AI-based unboxing setup guidance method includes the following steps S301 to S303.

S301, displaying preset demo pages through a client program installed on the smart mobile terminal, to guide a user to perform unboxing configuration on an electronic product.

The client program has a plurality of the preset demo pages. In response to a displaying instruction, the smart mobile terminal displays the preset demo pages through the built-in client program to guide the user to perform unboxing configuration on the electronic product.

The demo pages include preset guidance information, and the guidance information includes: information for introducing the electronic product, and/or, at least one of texts, demo animations and voices for guiding the user to perform one or more actions related to unboxing. The one or more actions related to unboxing may, but are not limited to, include: assembling the electronic product, configuring the parameters of the electronic product, using the electronic product, and troubleshooting and repairing the electronic product.

Further, in other embodiments of the present disclosure, the method further includes: obtaining a download link of the client program, downloading an installation program of the client program according to the download link, and running the installation program to install the client program on the smart mobile terminal. The client program matches device information of the smart mobile terminal.

Specifically, the smart mobile terminal 110 may obtain the download link of the client program by scanning a graphic code (e.g., QR code or bar code) on the electronic product. Alternatively, the smart mobile terminal 110 may obtain the download link of the client program inputted by the user through an input device (e.g., keyboard, touch display screen, etc.). Alternatively, the smart mobile terminal 110 may obtain the download link of the client program according to search actions performed by the user on the application mall software.

S302, obtaining interactive data between the user and the client program during the unboxing configuration, and transmitting a text generated based on the interactive data to the model server.

The smart mobile terminal uses the GAILLM on the model server to analyze the interactive data between the user and the client program during the unboxing configuration, to determine intention of the user.

The interactive data may include text information inputted by the user on the demo page.

Optionally, the interactive data may further include a user speech transmitted by the electronic product or a user speech obtained by built-in microphone(s) of the smart mobile terminal. The smart mobile terminal may use a built-in speech-to-text engine to convert the user speech into the text. Alternatively, the smart mobile terminal may use a speech-to-text engine on an external device (such as a conversion server in the cloud) to convert the user speech into the text.

Optionally, the interactive data may further include associated data of various preset actions performed by the user on the demo pages, such as, data of the user clicking options or buttons in the menu bar of the demo pages, data of sliding gestures made by the user on the demo pages, etc.

S303, determining a target demo page according to an analysis result transmitted from the model server, and displaying the target demo page.

Optionally, in other embodiments of the present disclosure, the method further includes: generating a virtual character/avatar corresponding to personal information of the user, and integrating the virtual character/avatar to the demo pages; and synchronously controlling the virtual character/avatar while displaying the target demo page to facilitate interaction with the user.

Optionally, in other embodiments of the present disclosure, the demo pages include a first demo page designed to guide paring process, and the method further includes: initiating pairing with the electronic product through the client program and utilizing a short-range wireless communication network, in response to actions of the user on the first demo page.

Optionally, in other embodiments of the present disclosure, the demo pages further include a second demo page for guiding registration of new users. The method further includes: obtaining registration information inputted by the user on the second demo page, and performing actions for user registration according to the registration information.

Figure 3:
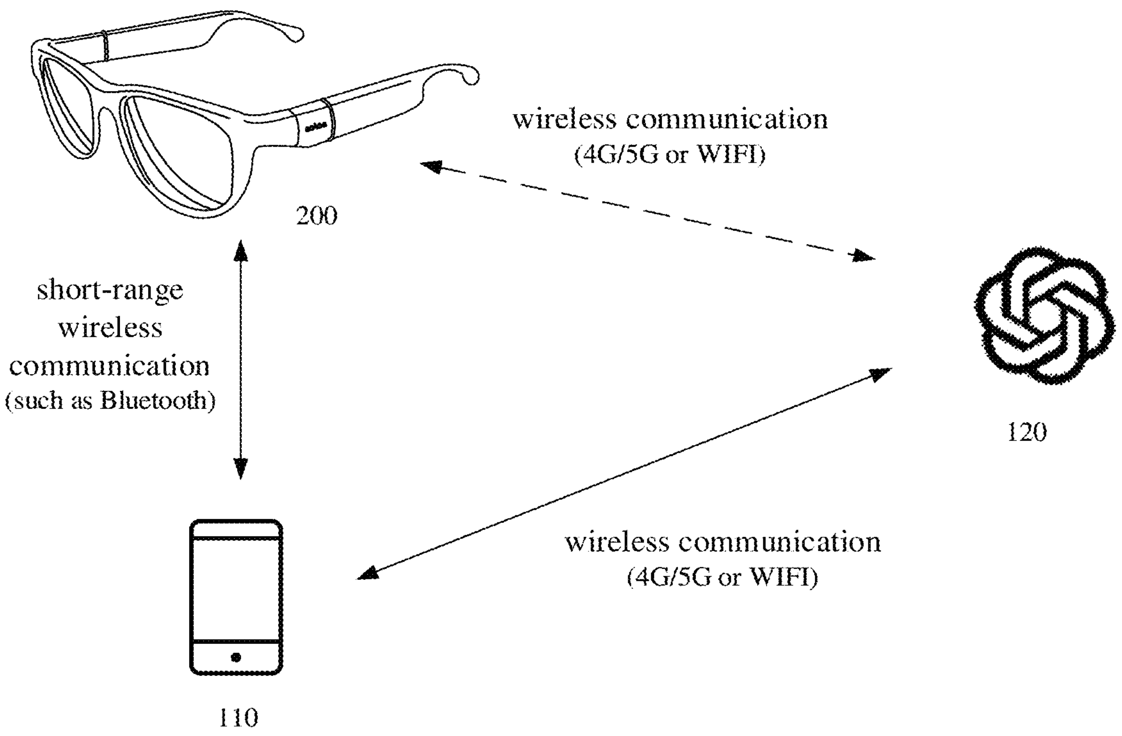
FIG. 3 is a schematic diagram of application scenario of the method shown in FIG. 2.

For ease of understanding, the following will particularize the AI-based unboxing setup guidance method provided in the present disclosure in conjunction with FIGS. 3 to 11. In one application example, as shown in FIG. 3, the guidance method is used to guide actions of unboxing configuration for the smart glasses 200 through the smart phone 110 and the model server 120. It is understandable that, in addition to the scenario of unboxing configuration, the user can further obtain the guidance for setting the smart glasses 200 through the guidance method at any other time or in any other scenarios.

Specifically, the user takes out the smart glasses 200 from a packaging box, and then obtains a download link of a client program (APP) by using a camera on the smart phone 110 to scan a QR code on the smart glasses 200. The smart phone 110 downloads an installation program of the APP according to the download link, and runs the installation program to install the APP on the smart phone 110. The APP is preset with a plurality of demo pages for guiding users in the smart glasses of assembling, setting up, using, troubleshooting, repairing and service request are preset in the APP.

Figure 4:
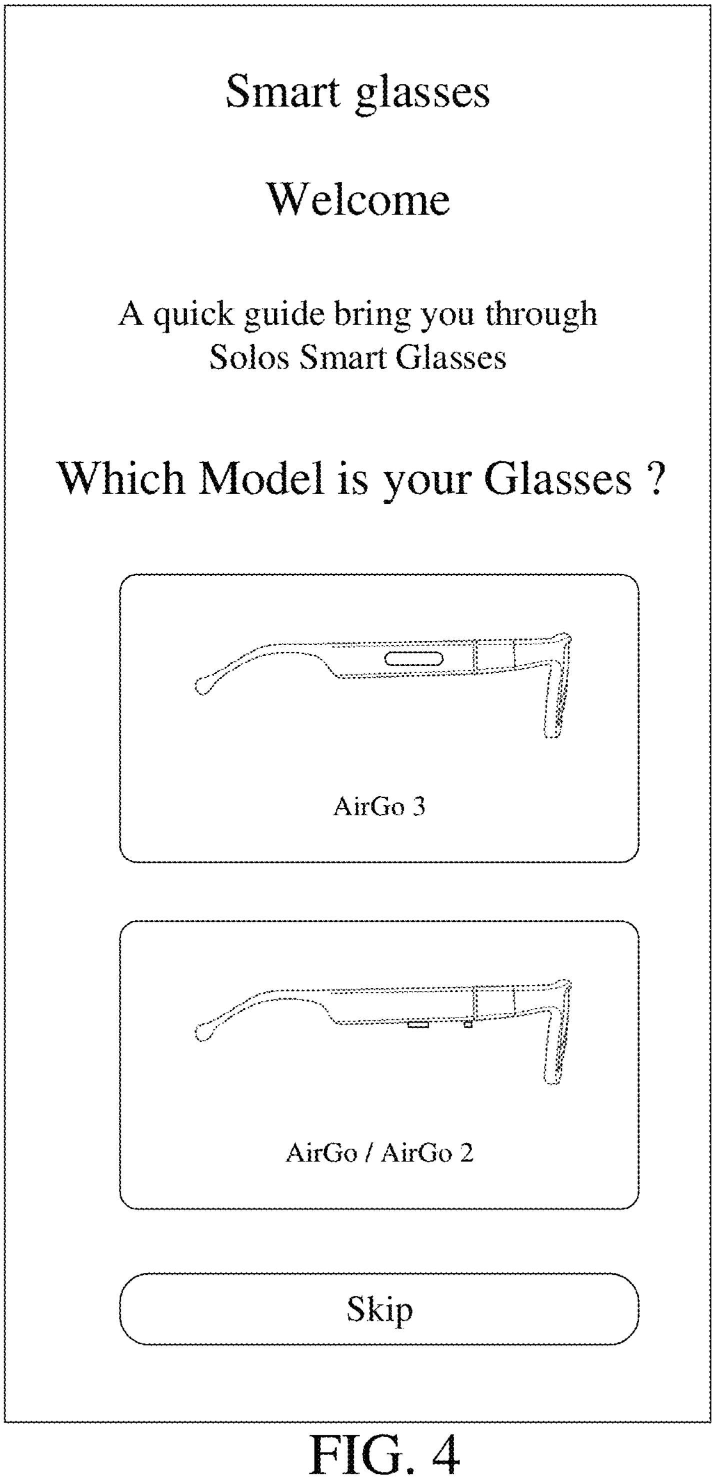
FIG. 4 is one schematic diagram of demo pages of the method shown in FIG. 2.

It is understandable that different models of smart glasses may have different functions. The smart phone 110 runs the APP and automatically displays the start page of the demo pages as shown in FIG. 4 to guide the user to choose a model of the smart glasses 200, and determines corresponding demo pages according to the model chosen by the user, so as to determine a target demo page from the corresponding demo pages according to an analysis result returned from the model server in subsequent actions. Further, when the target demo page is determined by other devices (such as the above-mentioned application server), the smart phone 110 transmits the information of the model of the smart glasses 200 chosen by the user to the other devices, so that the other devices determine the target demo page according to the information of the model and the analysis result.

Figure 5:
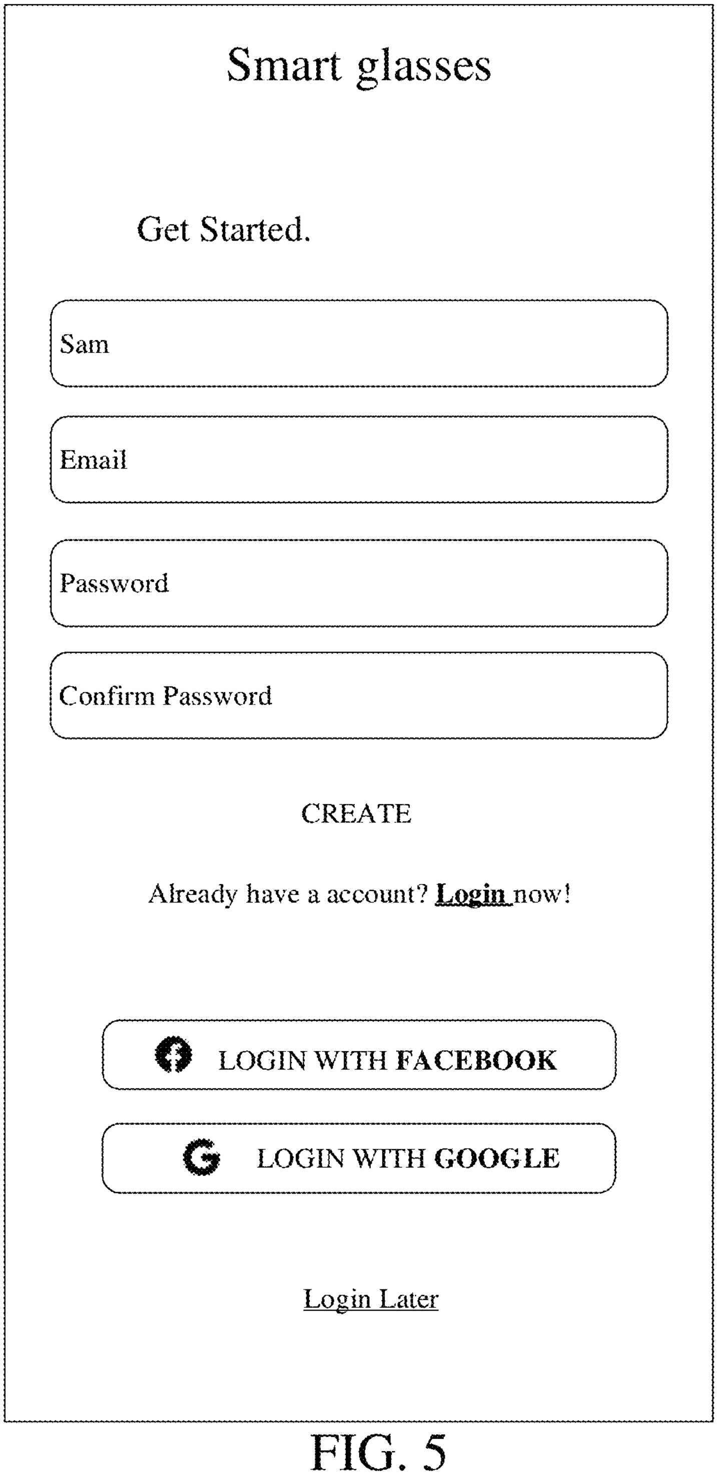
FIG. 5 is one schematic diagram of demo pages of the method shown in FIG. 2.

Further, in response to the user clicking the button of "skip" in a demo page shown in FIG. 4, the smart phone 110 displays the demo page shown in FIG. 5 to guide the user to create a new user. The smart phone 110 obtains registration information inputted by the user in the demo page shown in FIG. 5, and performs actions for user registration according to the registration information. Alternatively, the user may speak a voice command of "skip" to instruct the smart phone 110 to display the next demo page. The details of the smart phone analyzing the voice command through the GAILLM to determine the corresponding action(s) can be referred to the above-mentioned related embodiments, which will not be described again here.

Further, in response to the user clicking the button of "Login Later" in a demo page shown in FIG. 5, the smart phone 110 displays a navigation page shown in FIG. 6. The navigation page includes a virtual character 401, choosing menus 402 (such as, "Yes, please guide me", "I am good thank you"), prompt texts (such as "Would you like me to guide your set up process?"), a control button 403 and prompt voices, (such as "Would you like me to guide your set up process? Please speak your choice, or you also can make the choice by clicking the option of "Yes, please guide me" or "I am good thank you" (not shown in FIG. 6).

Figure 6:
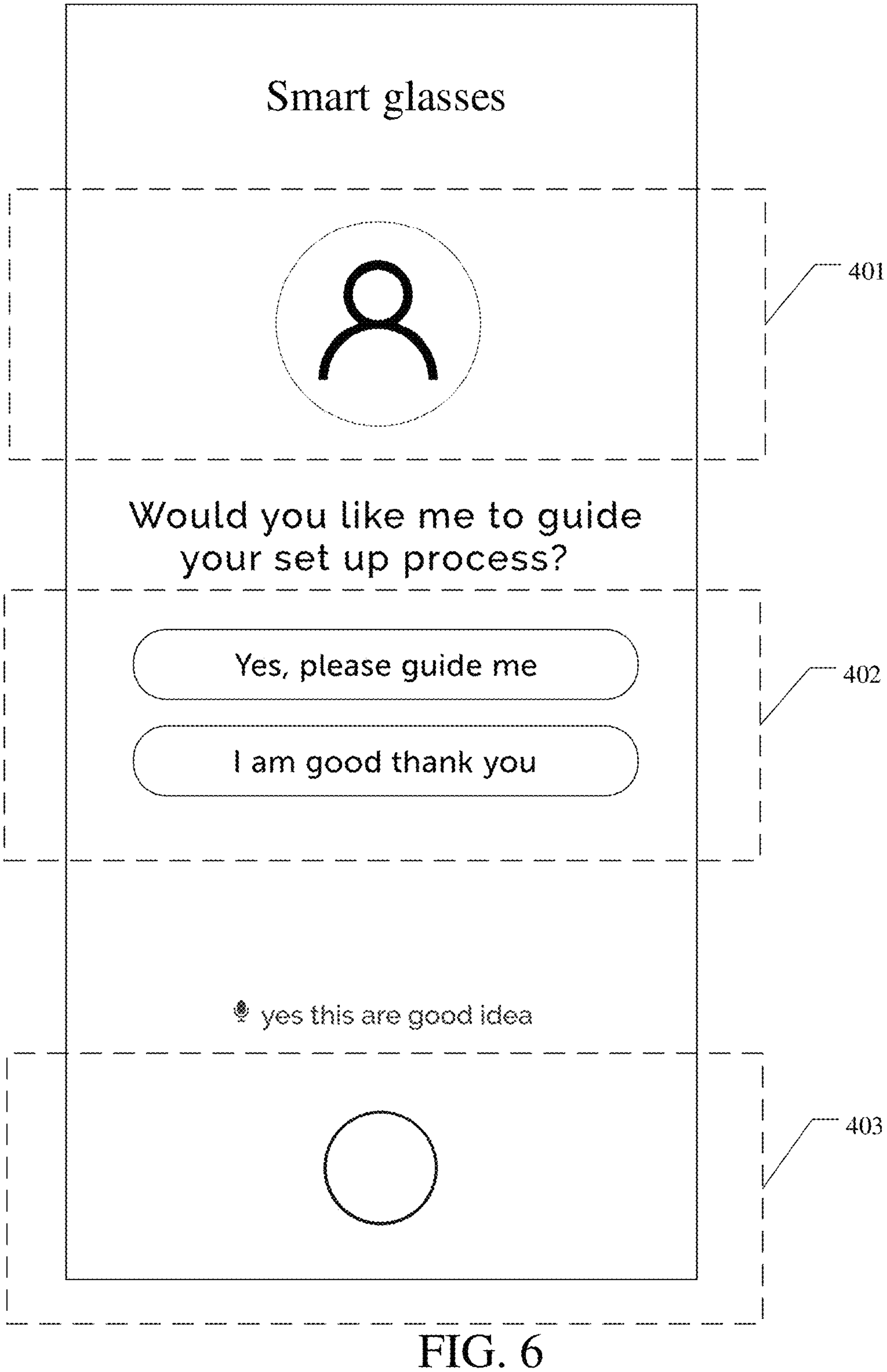
FIG. 6 is one schematic diagram of demo pages of the method shown in FIG. 2.

Further, the smart phone 110 obtains the interactive data between the user and the APP, such as a speech spoken by the user while the user pressing the control button 403, converts the obtained speech into a text, transmits the text to a model server, and displays the text in the current demo page, such as "yes, this are good idea" shown in FIG. 6.

The model server performs semantic analysis on the text through the GAILLM to obtain the intention of the user (that is, hoping to perform guidance actions), and transmits the analysis result to the smart phone 110.

Figure 7:
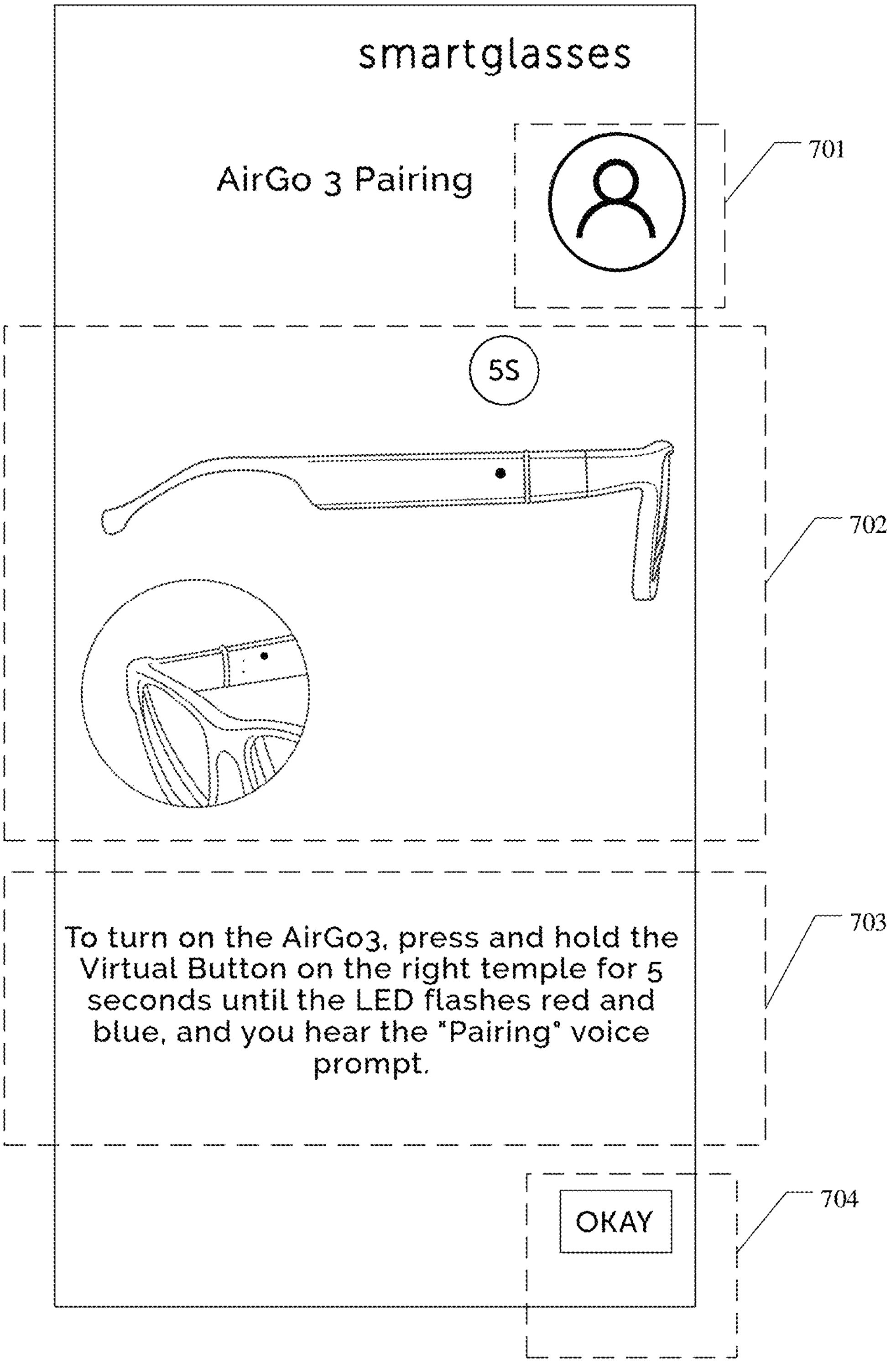
FIG. 7 is one schematic diagram of demo pages of the method shown in FIG. 2.

The smart phone 110 determines to display a demo page for guiding the user to pair with the smart glasses 200 shown in FIG. 7, according to the analysis result. The demo page shown in FIG. 7 includes a virtual character 701, a demo animation 702, prompt texts 703, a control button or a navigation menu 704, and prompt voice, such as the voice corresponding to the prompt texts 703 (not shown in FIG. 7).

Figure 8:
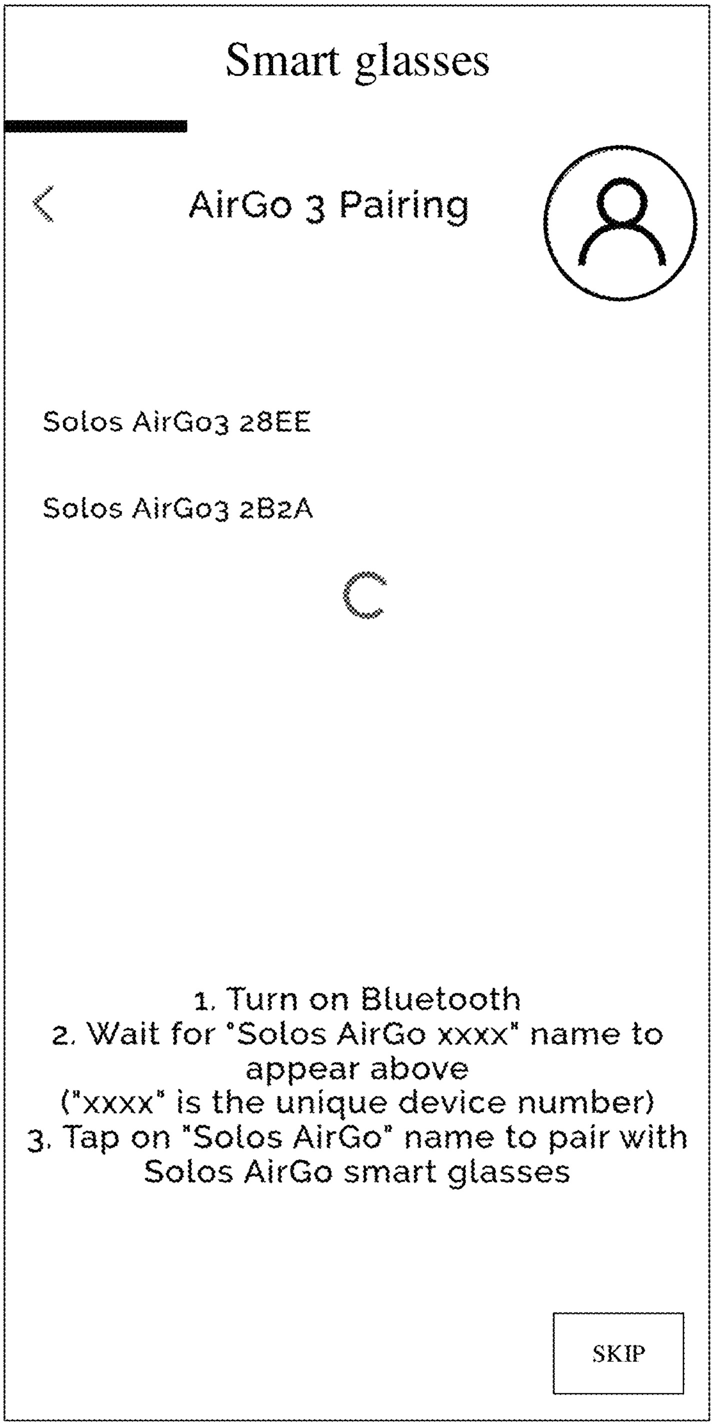
FIG. 8 is one schematic diagram of demo pages of the method shown in FIG. 2.

Then, in response to the user clicking the control button or navigation menu 704 in FIG. 7, the smart phone 110 displays a demo page as shown in FIG. 8 to guide the user to perform pairing actions on the smart phone 110 and prompt the pairing process through the voice, text, and animation. After detecting that the pairing with the smart glasses 200 is completed, the smart phone 110 displays a demo page as shown in FIG. 9 to prompt the user that the pairing is completed.

Figure 9:
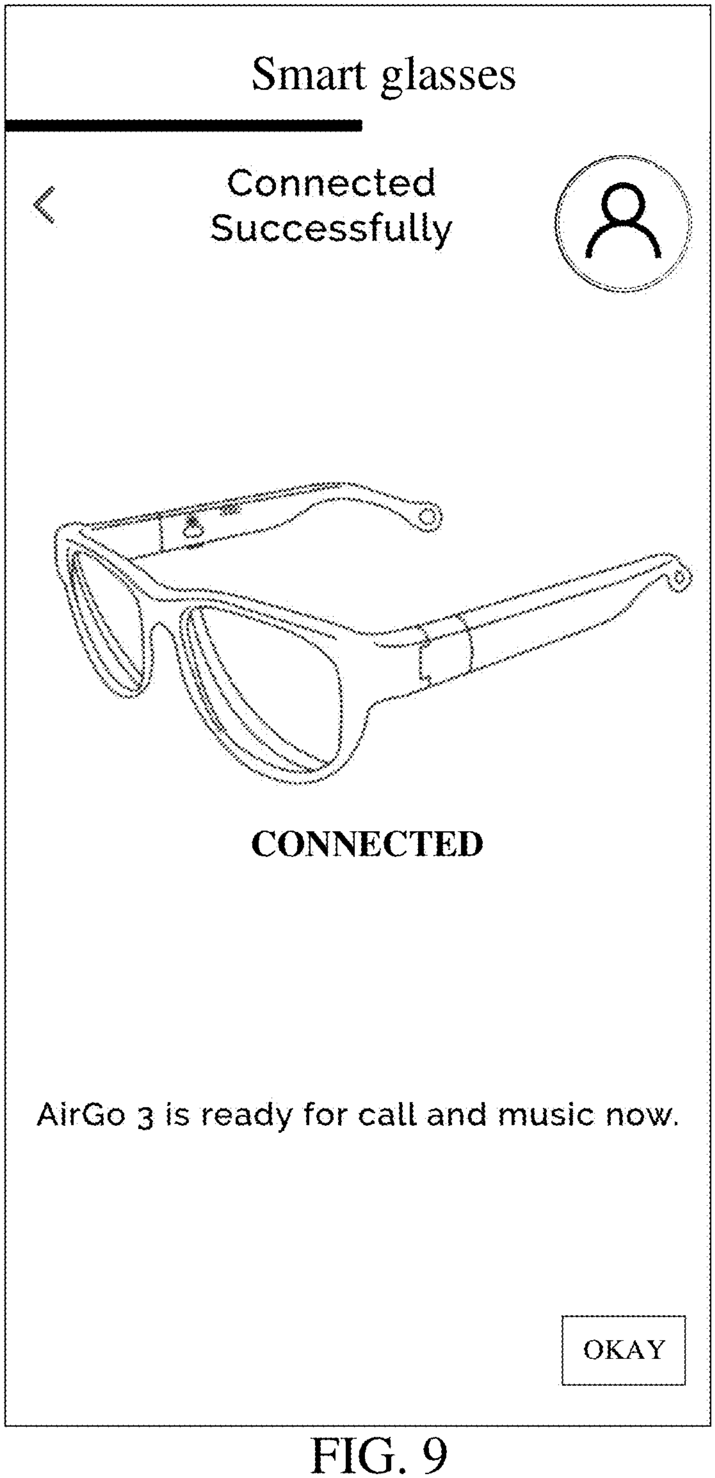
FIG. 9 is one schematic diagram of demo pages of the method shown in FIG. 2.

Further, the smart phone 110 obtains interactive data between the user and the demo page shown in FIG. 9, such as, data inputted by the user clicking a button of "OK", or a user speech obtained through microphone(s). The smart phone 110 transmits a text generated based on the interactive data to the model server. The model server analyzes the text, determines that the user may want to ask a question, and transmits the analysis result including instruction information of guiding the user to ask the question to the smart phone 110. The smart phone 110 displays a demo page as shown in FIG. 10 according to the analysis result to guide the user to ask the question.

Figure 10:
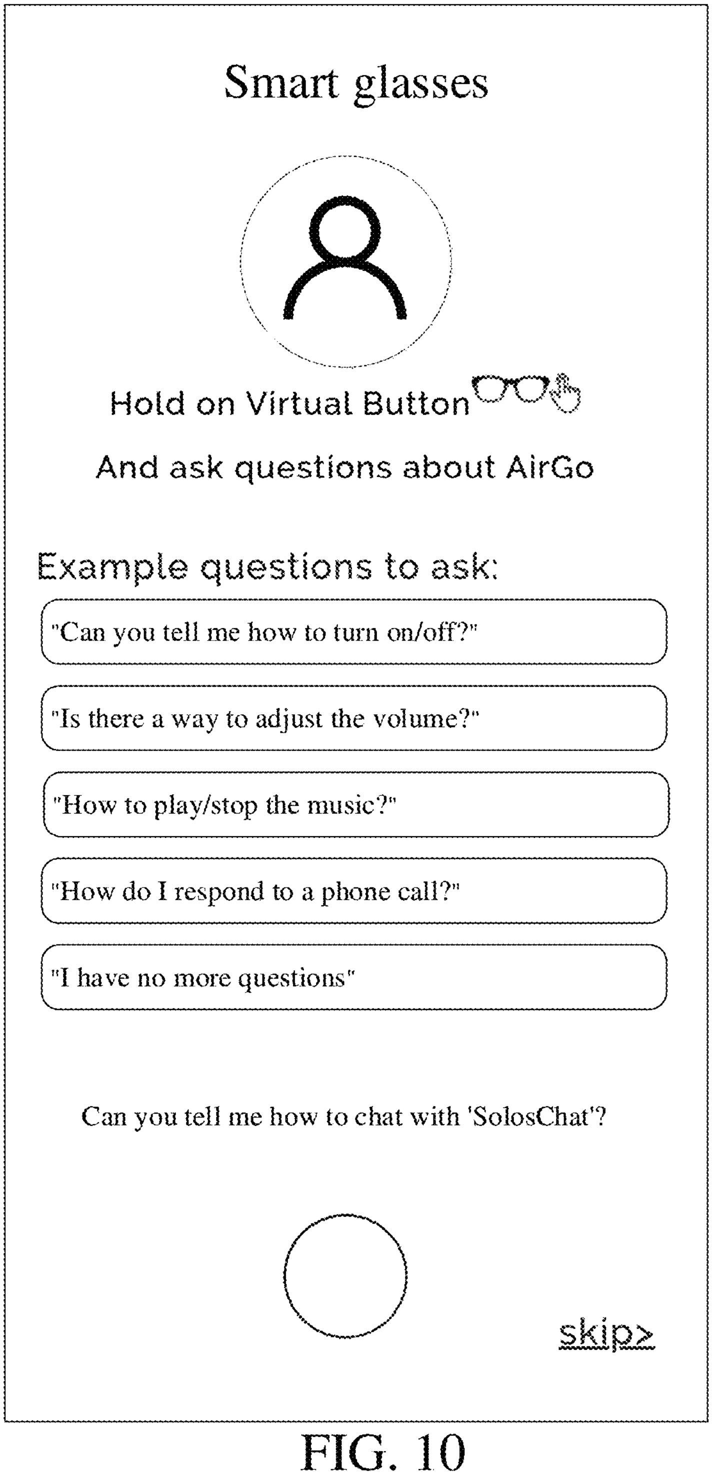
FIG. 10 is one schematic diagram of demo pages of the method shown in FIG. 2.
Figure 11:
FIG. 11 is one schematic diagram of demo pages of the method shown in FIG. 2.

As shown in FIG. 10, the demo page includes multiple navigation menus for helping the user to choose a question to be answered, such as, "Can you tell me how to turn on/off?", "Is there a way to adjust the volume?", etc. Furthermore, the demo page may further include prompt voice(s), such as a prompt voice of "Please choose one from the example questions to ask, or Please hold on virtual button on the smart glasses and ask questions about AirGo". At this time, when the user presses and holds the virtual button on the smart glasses and speaks a question related to AirGo, the smart glasses 200 will obtain a user speech and transmit the user speech to the smart phone 110. The smart phone 110 may convert the user speech into a corresponding text through a built-in speech-to-text engine or a conversion server, and display the content of the text in the current demo page, such as "Can you tell me how to chat with 'Solos Chat'?" as shown in FIG. 10. At the same time, the smart phone 110 transmits the text to the model server, so as to perform the semantic analysis on the text through the model server. The smart phone 110 determines whether the question of the user is in the navigation menus based on the analysis result returned from the model server. When the question of the user is in the navigation menus, the smart phone 110 obtains data of the corresponding demo page(s) for displaying according to a hyperlink associated with the navigation menu corresponding to the question of the user. When the question of the user is not in the navigation menus, the smart phone 110 determines and displays the target demo page shown in FIG. 11 according to preset related relationships between different analysis results and demo pages.

It should be noted that, FIG. 3 to FIG. 11 are only examples, and are not limited thereto in practical applications.

For details not covered in the above-mentioned embodiments of the AI-based unboxing setup guidance method, please refer to the relevant descriptions in the above-mentioned embodiments of AI-based unboxing setup guidance system and the following embodiments of the smart mobile terminal, which will not be described again here.

The AI-based unboxing setup guidance method provided in the embodiment, by the smart mobile terminal displaying the demo pages through the built-in client program to guide the user to perform unboxing configuration on the electronic product, obtaining user's intention during the interaction process with the user by analyzing the interactive data through GAILLM, and displaying the target demo page according to the user's intention to solve the problem of the user, can effectively guide the users to complete the unboxing process, enhance the efficiency of setup and usage of the electronic product, and thereby increasing user engagement and loyalty to the product.

Figure 12:
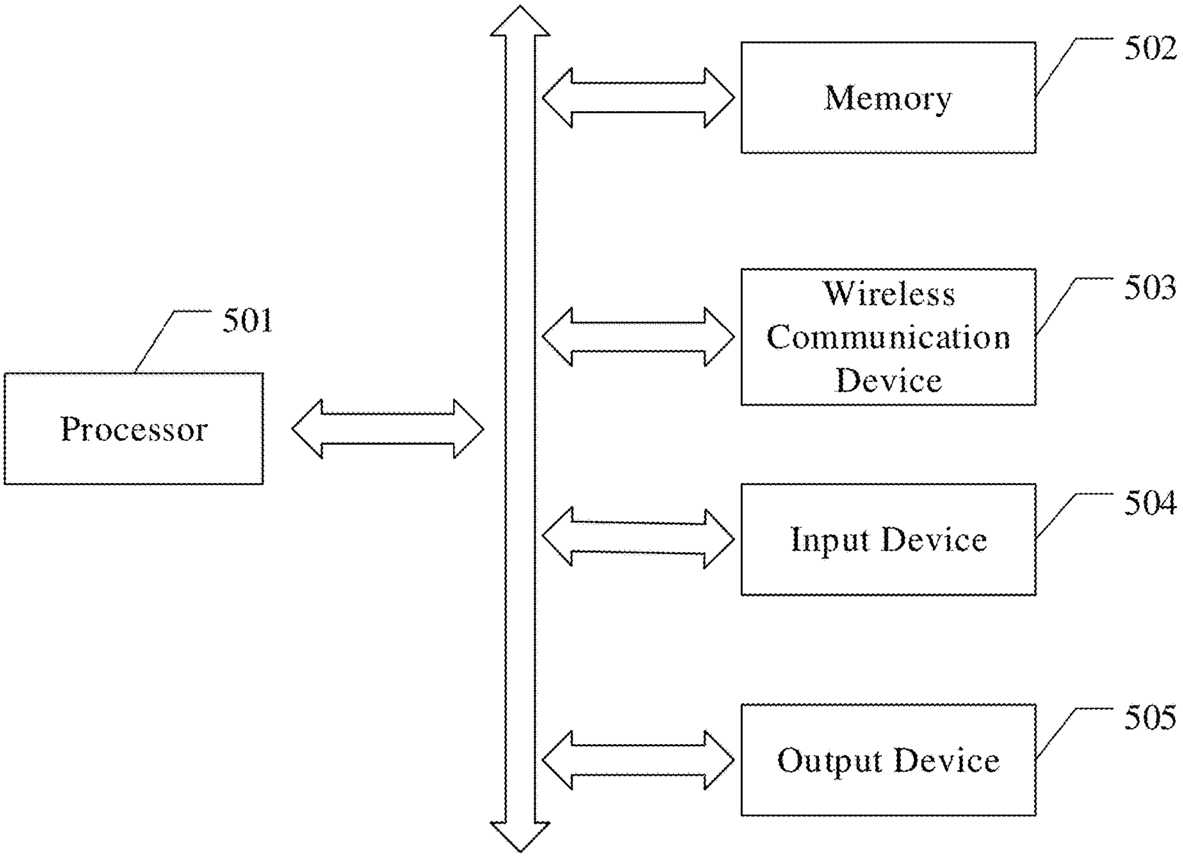
FIG. 12 is a schematic structural diagram of a smart mobile terminal according to one embodiment of the present disclosure.

Referring to FIG. 12, a schematic structural diagram of a smart mobile terminal according to one embodiment of the present disclosure. The smart mobile terminal includes: one or more processors 501, one or more memories 502, one or more wireless communication devices 503, one or more input devices 504 and one or more output devices 505 (to facilitate the understanding, only one of each device is shown in FIG. 12, which may not be limited to this in practical applications).

The one or more processors 501 are electrically connected to the one or more memories 502, one or more wireless communication devices 503, one or more input devices 504 and one or more output devices 505, and they communicate data with each other through a communication bus.

The one or more memories 502 may be a non-transitory storage. The one or more input devices 504 may be at least one of: a camera, a microphone, a touch panel, a physical button or a mouse, and various sensors. The one or more output devices 505 may be at least one of a display screen and a speaker.

The one or more wireless communication devices 503 include: a wireless signal transceiver and peripheral circuits. The wireless signal transceiver may, but is not limited to, use at least one of: WiFi (Wireless Fidelity) protocol, NFC (Near Field Communication) protocol, ZigBee protocol, UWB (Ultra-Wide Band) protocol, RFID (Radio Frequency Identification) protocol, and cellular mobile communication protocol (such as 3G/4G/5G, etc.), to perform the data transmission.

One or more computer programs executable on the processor 501 are stored on the non-transitory storage 502, the one or more computer programs include:

- instructions used for: displaying, through the output device 505, demo pages in the client program, to guide a user to perform unboxing configuration on the smart mobile terminal, where the client program has a plurality of the demo pages;
- instructions used for obtaining, through the input device 504, interactive data between the user and the client program during the unboxing configuration, and transmitting, through the wireless communication device 503, a text generated based on the interactive data to a model server, so that the model server analyzes the text through a GAILLM to obtain an analysis result; and
- instructions used for: receiving, through the wireless communication device 503, the analysis result transmitted from the model server, determining a target demo page according to the analysis result, and displaying, through the output device 505, the target demo page.

Optionally, in other embodiments of the present disclosure, the one or more computer programs further include:

- instructions used for: obtaining a download link of the client program, and downloading, through the wireless communication device 503, an installation program of the client program according to the download link; and
- instructions used for: running the installation program to install the client program on the smart mobile terminal 110, where the client program matches device information of the smart mobile terminal.

Optionally, in other embodiments of the present disclosure, at least one of the demo pages is a user interface (UI), and the interactive data includes: texts inputted by the user on the UI.

Optionally, in other embodiments of the present disclosure, the interactive data includes: a user speech. The input device 504 includes one or more microphones. The one or more computer programs further include: instructions used for, obtaining, through the one or more microphones, the user speech, and converting the user speech into the text.

Optionally, in other embodiments of the present disclosure, the one or more computer programs further include:

- instructions used for, generating a virtual character/avatar corresponding to personal information of the user, and integrating the virtual character/avatar to the demo pages; and
- instructions used for, synchronously controlling the virtual character/avatar while displaying the target demo page to facilitate interaction with the user.

Optionally, in other embodiments of the present disclosure, the one or more computer programs further include:

- instructions for: obtaining registration information inputted by the user on the demo page for guiding registration of new users, and performing actions for user registration according to the registration information.

For details not covered in the above-mentioned embodiments of the smart mobile terminal, please refer to the relevant descriptions in the above-mentioned embodiments of the AI-based unboxing setup guidance system and method, which will not be described again here.

The smart mobile terminal provided in this embodiment displays the demo pages to guide the user to perform unboxing configuration on the electronic product through the built-in client program, obtains user's intention during the interaction process with the user by analyzing the interactive data through GAILLM, and displays the target demo page according to the user's intention to solve the problem of the user. Thus, users can be effectively guided to complete the unboxing process, the efficiency of setup and usage of the electronic product is enhanced, and thereby increasing user engagement and loyalty to the product.

The present disclosure further provides a non-transitory computer-readable storage medium, which can be set in the smart mobile terminal in the above-mentioned embodiments, and may be the memory 502 in the embodiment shown in FIG. 12. The computer-readable storage medium stores one or more computer programs. When the one or more programs are executed by the processor, all or part of the AI-based unboxing setup guidance method for electronic products, in the above-mentioned embodiment(s) is performed. Further, the computer-readable storage medium may also be a USB flash drive, a mobile hard disk, a read-only memory (ROM), a Random Access Memory (RAM), a disk, or a CD-ROM, or any medium capable of storing program code.

It should be understood that in the above-described embodiments of the present disclosure, the above-mentioned AI-based unboxing setup guidance system, method for electronic products, and smart mobile terminal may be implemented in other manners. For example, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interfaces/devices, and may also be electrical, mechanical or in other forms.

It should be noted that for the various method embodiments described above, for the sake of simplicity, they are described as a series of action combinations. However, those skilled in the art should understand that the present disclosure is not limited by the order of the described actions, as certain steps can be performed in a different order or simultaneously. Additionally, it should be understood that the embodiments described in this invention are preferred embodiments, and the actions and modules involved are not necessarily required for the present disclosure.

In the above-mentioned embodiments, the descriptions of each embodiment have different focuses. For portions not described in a particular embodiment, reference can be made to relevant descriptions in other embodiments.

The above is a description of the AI-based unboxing setup guidance system, method for electronic products, and smart mobile terminal provided by the present disclosure. Those skilled in the art should understand that based on the embodiments of the present disclosure, there may be changes in specific implementation methods and application scope. Therefore, the content of this specification should not be construed as limiting the present disclosure.

What is claimed is:

1. An artificial intelligence (AI)-based unboxing setup guidance system for electronic products, comprising: a smart mobile terminal and a model server, wherein a generative artificial intelligence large language model (GAILLM) is configured on the model server, and a client program with a plurality of demo pages is installed on the smart mobile terminal;

- the smart mobile terminal is configured for: displaying, through the client program, the demo pages to guide a user to perform unboxing configuration on an electronic product, obtaining interactive data between the user and the client program during the unboxing configuration, and transmitting a text generated based on the interactive data to the model server;

the model server is configured for: analyzing the text through the GAILLM to obtain an analysis result, and transmitting the analysis result to the smart mobile terminal; and the smart mobile terminal is further configured for: determining a target demo page according to the analysis result, and displaying the target demo page.

2. The AI-based unboxing setup guidance system of claim 1, wherein the smart mobile terminal is further configured for:

obtaining a download link of the client program, and downloading an installation program of the client program according to the download link; and running the installation program to install the client program on the smart mobile terminal, wherein the client program matches device information of the smart mobile terminal.

3. The AI-based unboxing setup guidance system of claim 1, wherein at least one of the demo pages is a user interface (UI), and the interactive data comprises texts inputted by the user on the UI.

4. The AI-based unboxing setup guidance system of claim 1, wherein the interactive data comprises a user speech, and the smart mobile terminal is further configured for:

receiving the user speech transmitted from the electronic product, or, obtaining the user speech through a microphone built-into the smart mobile terminal; and converting the user speech into the text.

5. The AI-based unboxing setup guidance system of claim 1, wherein, the smart mobile terminal is further configured for: generating a virtual character corresponding to personal information of the user, and integrating the virtual character to the demo pages; and the smart mobile terminal is further configured for: synchronously controlling the virtual character while displaying the target demo page to facilitate interaction with the user.

6. The AI-based unboxing setup guidance system of claim 1, wherein the demo pages comprise a first demo page designed to guide paring process, and the smart mobile terminal is further configured for:

in response to actions of the user performed on the first demo page, initiating pairing with the electronic product through the client program and utilizing a short-range wireless communication network.

7. The AI-based unboxing setup guidance system of claim 6, wherein the short-range wireless communication network comprises: a Bluetooth network, a Wireless Fidelity network, and a Near Field Communication network.

8. The AI-based unboxing setup guidance system of claim 1, wherein the demo pages comprise a second demo page for guiding registration of new users, and the smart mobile terminal is further configured for:

obtaining registration information inputted by the user on the second demo page, and performing actions for user registration according to the registration information.

9. An artificial intelligence (AI)-based unboxing setup guidance method for electronic products, implemented on a smart mobile terminal, wherein the AI-based unboxing setup guidance method comprises:

displaying preset demo pages through a client program installed on the smart mobile terminal, to guide a user to perform unboxing configuration on an electronic product, wherein the client program has a plurality of the demo pages;

obtaining interactive data between the user and the client program during the unboxing configuration, and transmitting a text generated based on the interactive data to a model server, so that the model server analyzes the text through a generative artificial intelligence large language model (GAILLM) to obtain an analysis result, and transmits the analysis result to the smart mobile terminal; and determining a target demo page according to the analysis result, and displaying the target demo page.

10. The AI-based unboxing setup guidance method of claim 9, further comprising:

obtaining a download link of the client program, and downloading an installation program of the client program according to the download link; and running the installation program to install the client program on the smart mobile terminal, wherein the client program matches device information of the smart mobile terminal.

11. The AI-based unboxing setup guidance method of claim 9, wherein at least one of the demo pages is a user interface (UI), and the interactive data comprises: texts inputted by the user on the UI.

12. The AI-based unboxing setup guidance method of claim 9, wherein the interactive data comprises: a user speech, and the AI-based unboxing setup guidance method further comprises:

receiving the user speech transmitted from the electronic product, or, obtaining the user speech through a microphone of the smart mobile terminal; and converting the user speech into the text.

13. The AI-based unboxing setup guidance method of claim 9, further comprising:

generating a virtual character corresponding to personal information of the user, and integrating the virtual character to the demo pages; and synchronously controlling the virtual character while displaying the target demo page to facilitate interaction with the user.

14. The AI-based unboxing setup guidance method of claim 9, wherein the demo pages comprise a first demo page designed to guide paring process, the AI-based unboxing setup guidance method further comprises:

in response to actions of the user performed on the first demo page, initiating pairing with the electronic product through the client program and utilizing a short-range wireless communication network.

15. The AI-based unboxing setup guidance method of claim 9, wherein the demo pages comprise a second demo page for guiding registration of new users, and the AI-based unboxing setup guidance method further comprises:

obtaining registration information inputted by the user on the second demo page, and performing actions for user registration according to the registration information.

16. A smart mobile terminal, comprising: a processor, a non-transitory storage, a wireless communication device, an input device and an output device;

wherein the processor is electrically connected with the non-transitory storage, the wireless communication device, the input device and the output device;

one or more computer programs executable on the processor are stored on the non-transitory storage, and the one or more computer programs comprise:

instructions for: displaying, through the output device, demo pages in the client program, to guide a user to perform unboxing configuration on the smart mobile terminal, wherein the client program has a plurality of the demo pages;

instructions for: obtaining, through the input device, interactive data between the user and the client program during the unboxing configuration, and transmitting, through the wireless communication device, a text generated based on the interactive data to a model server, so that the model server analyzes the text through a generative artificial intelligence large language model (GAILLM) and obtains an analysis result; and instructions for: receiving, through the wireless communication device, the analysis result transmitted from the model server, determining a target demo page according to the analysis result, and displaying, through the output device, the target demo page.

17. The smart mobile terminal of claim 16, wherein the one or more computer programs further comprise:

instructions for: obtaining a download link of the client program, and downloading, through the wireless communication device, an installation program of the client program according to the download link; and instructions for running the installation program to install the client program on the smart mobile terminal, wherein the client program matches device information of the smart mobile terminal.

18. The smart mobile terminal of claim 16, wherein at least one of the demo pages is a user interface (UI), and the interactive data comprises: texts inputted by the user on the UI.

19. The smart mobile terminal of claim 16, wherein the interactive data comprises: a user speech, the input device comprises one or more microphones, and the one or more computer programs further comprise:

instructions for: obtaining, through the one or more microphones, the user speech, and converting the user speech into the text.

20. The smart mobile terminal of claim 16, wherein the one or more computer programs further comprise:

instructions for: generating a virtual character corresponding to personal information of the user, and integrating the virtual character to the demo pages;

instructions for: synchronously controlling the virtual character while displaying the target demo page to facilitate interaction with the user.

21. The smart mobile terminal of claim 16, wherein the demo pages comprise a demo page for guiding registration of new users, and the one or more computer programs further comprise:

instructions for: obtaining registration information inputted by the user on the demo page, and performing actions for user registration according to the registration information.

* * * * *